Figure 1:
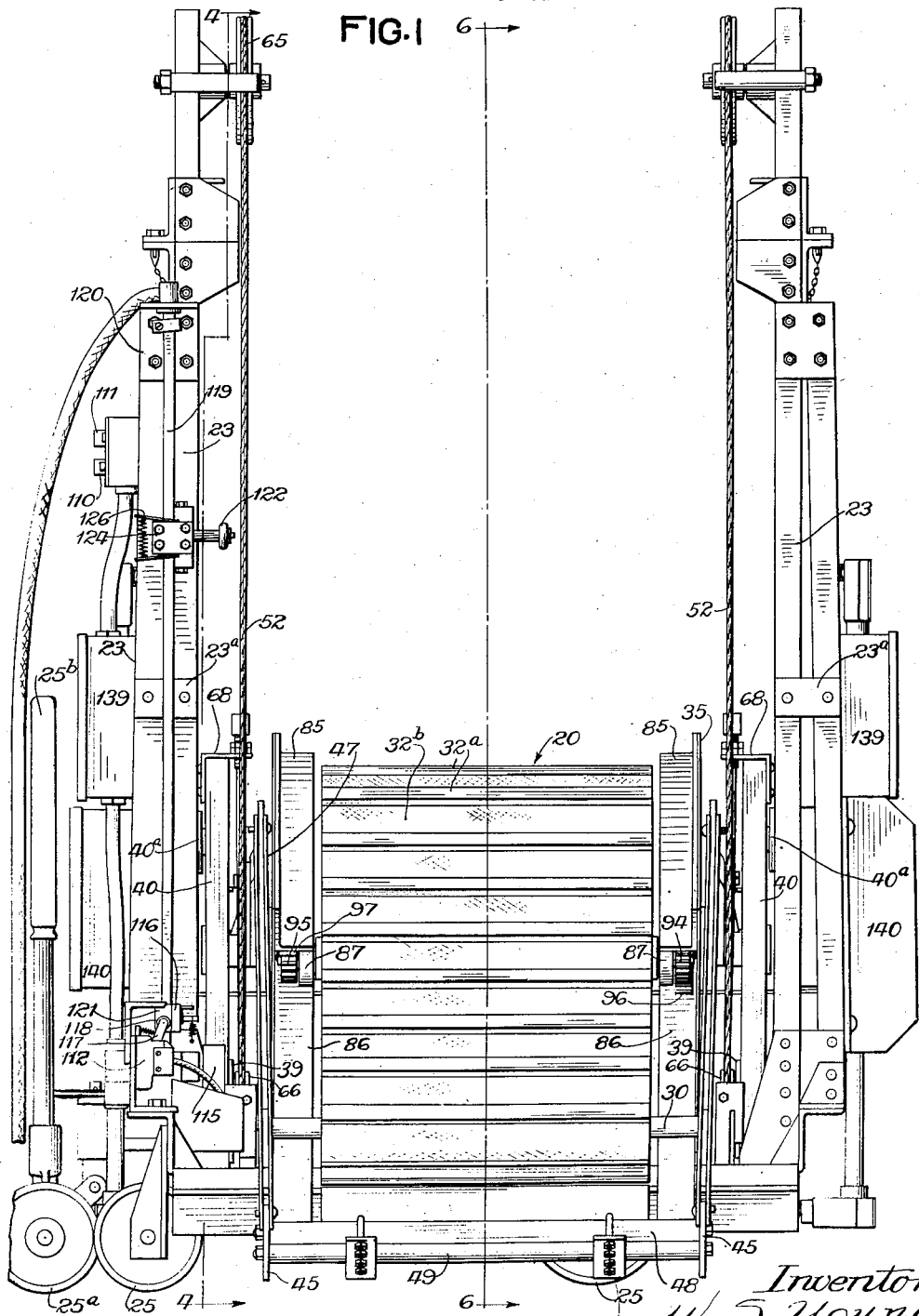

May 24, 1927.

W. S. YOUNG 1,629,771

PORTABLE STACKING MACHINE

Filed July 26, 1922    11 Sheets-Sheet 2

May 24, 1927.

W. S. YOUNG 1,629,771

PORTABLE STACKING MACHINE

Filed July 26, 1922     11 Sheets-Sheet 3

Witness
John E. Titus

Inventor
W. S. Young
By Lindahl, Parker & Carlson
Attys

May 24, 1927. 1,629,771
W. S. YOUNG
PORTABLE STACKING MACHINE
Filed July 26, 1922 11 Sheets-Sheet 5

Witness
John E. Titus

Inventor
W. S. Young
By Shindahl, Parker & Carlson
Attys

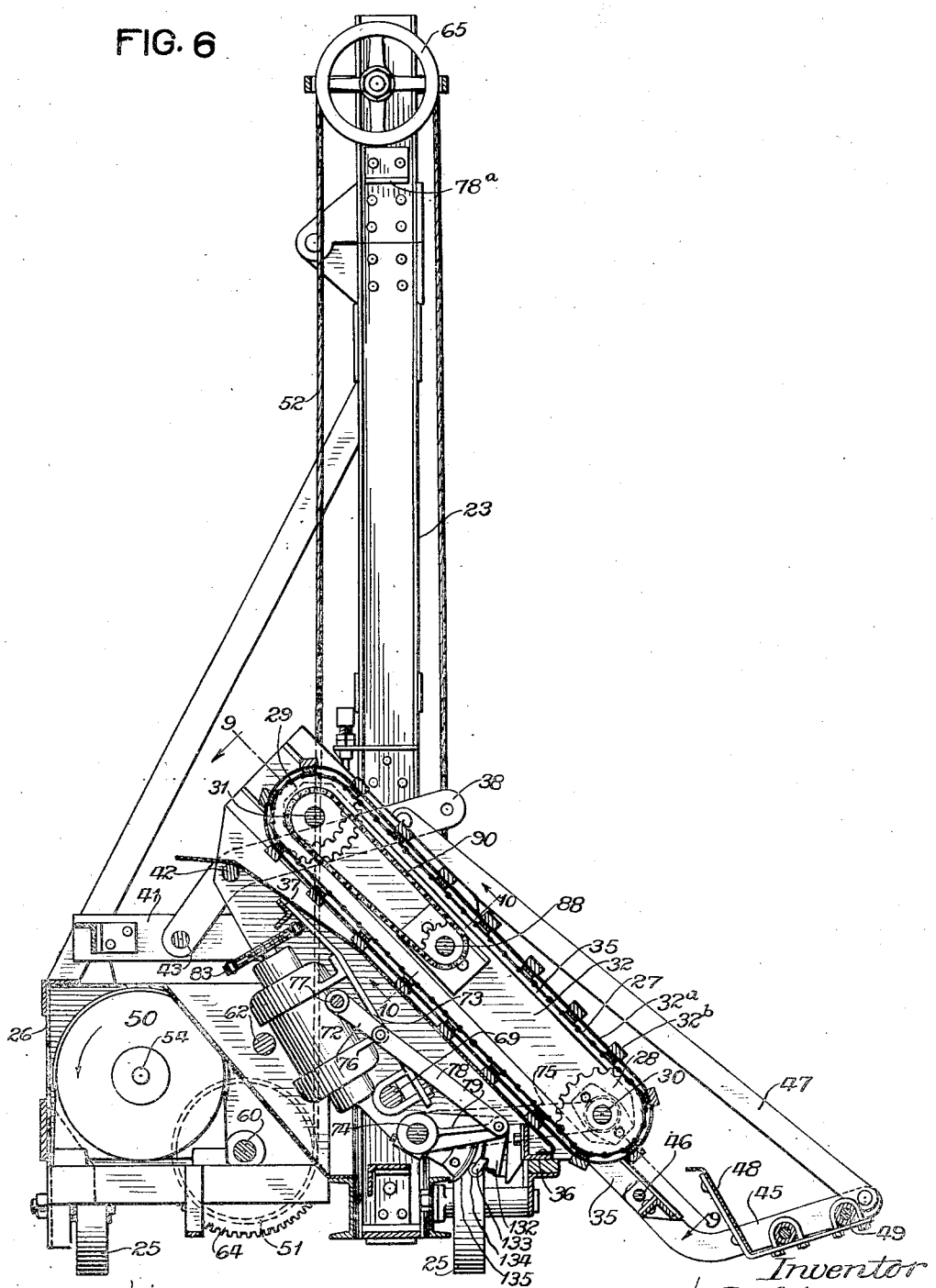

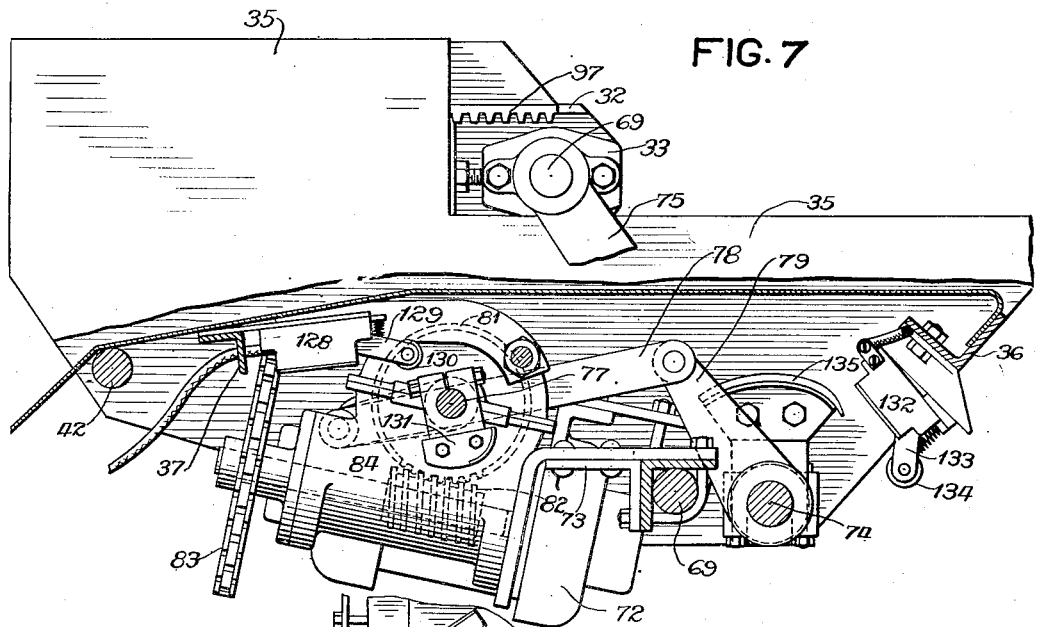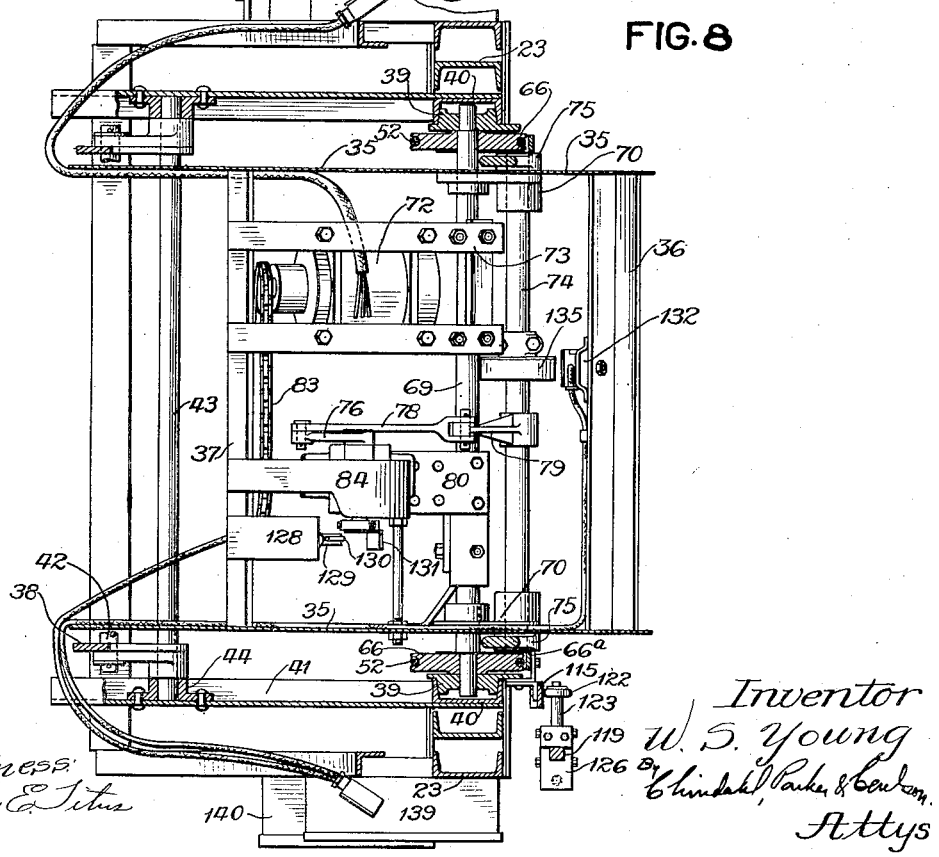

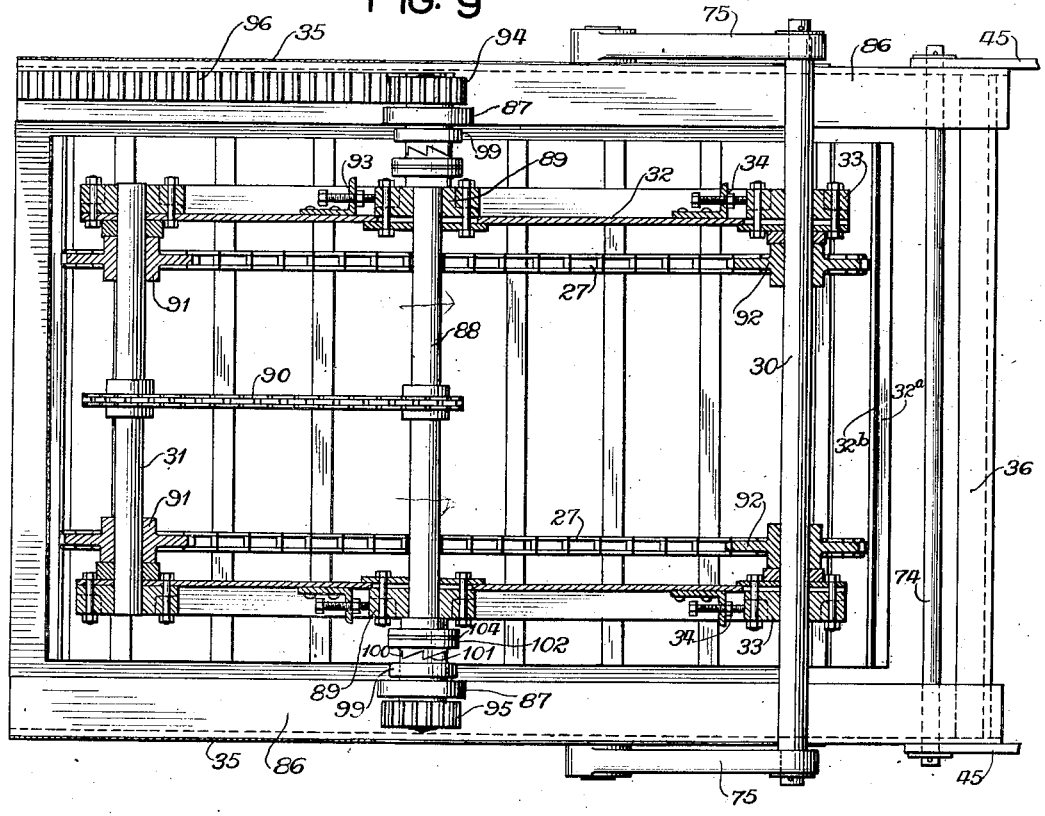
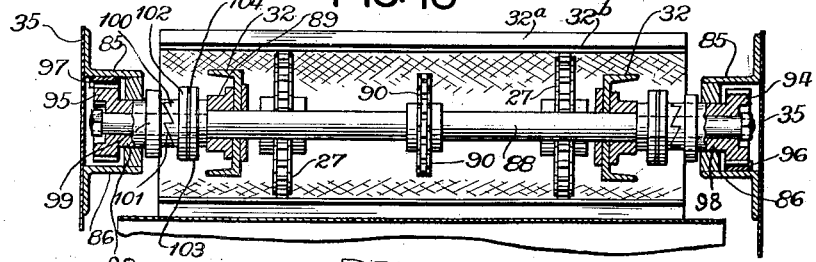
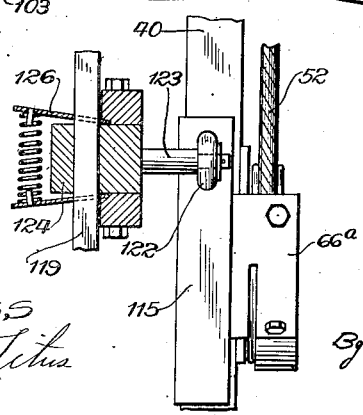

May 24, 1927.

W. S. YOUNG 1,629,771

PORTABLE STACKING MACHINE

Filed July 26, 1922    11 Sheets-Sheet 9

Witness
John E. Titus

Inventor
W. S. Young
By Chindahl, Parker & Carlson
Attys

May 24, 1927.  
W. S. YOUNG  
1,629,771  
PORTABLE STACKING MACHINE  
Filed July 26, 1922  11 Sheets-Sheet 10
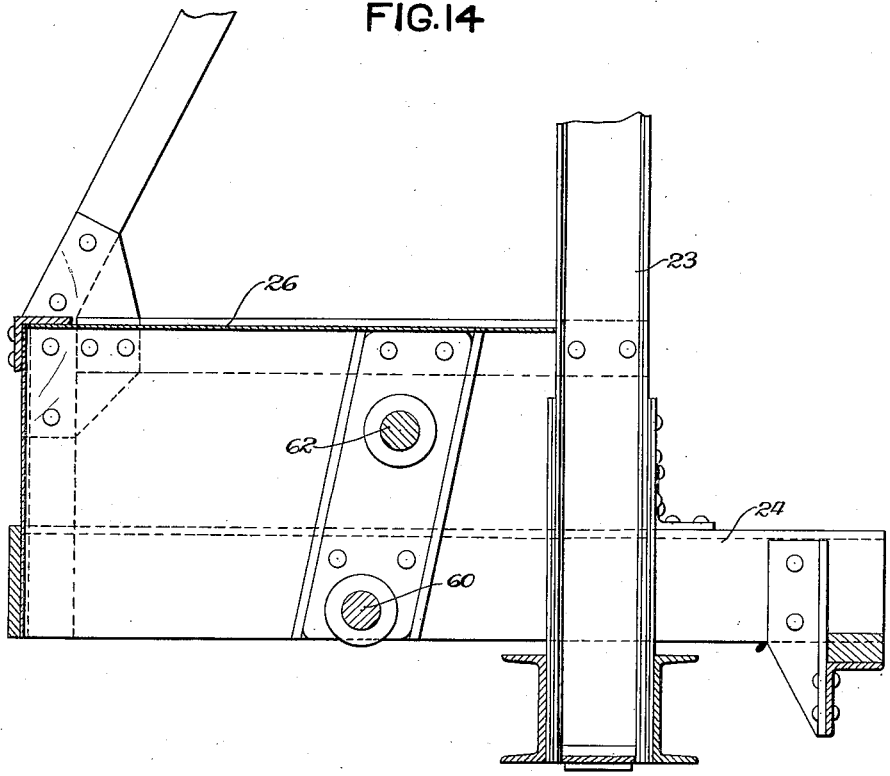
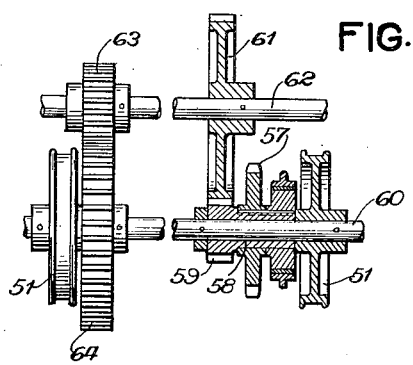
Witness
John E. Titus
Inventor
W. S. Young
By Chindahl, Poulin & Carlson
Attys May 24, 1927.
W. S. YOUNG
1,629,771
PORTABLE STACKING MACHINE
Filed July 26, 1922
11 Sheets-Sheet 11
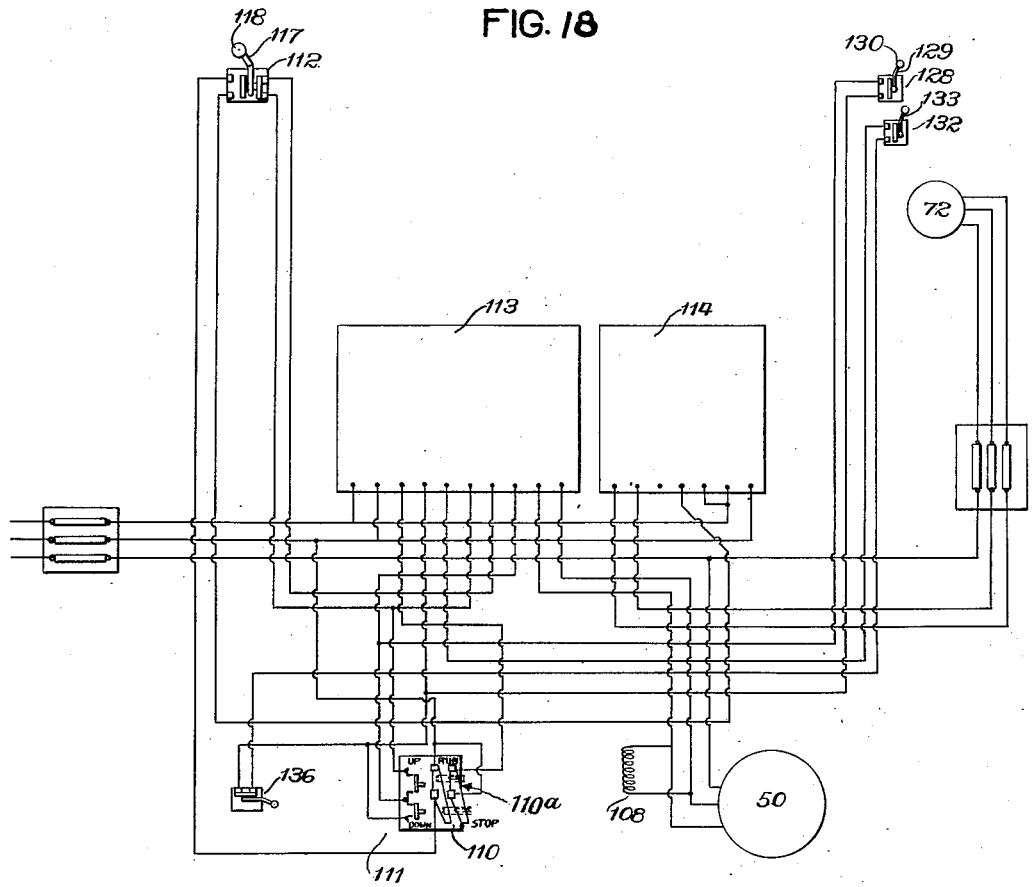
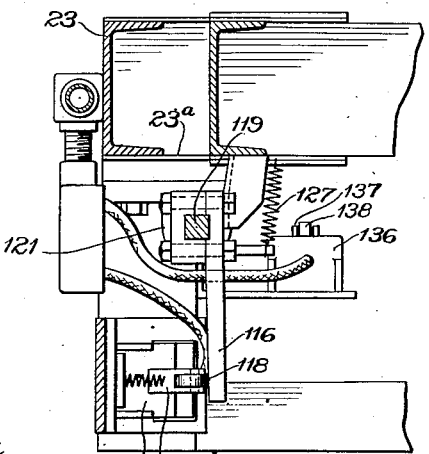
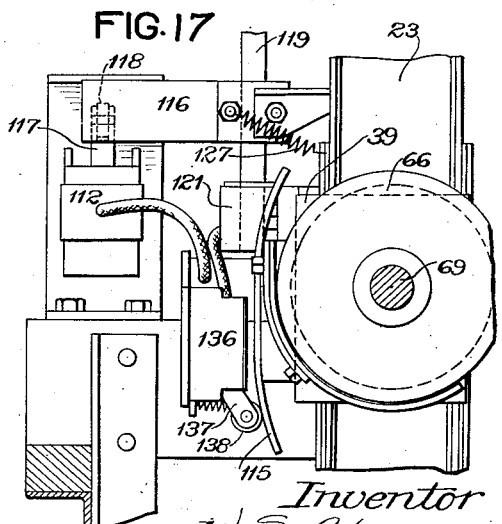

Patented May 24, 1927.

1,629,771

UNITED STATES PATENT OFFICE.

WILFRED S. YOUNG, OF CHICAGO, ILLINOIS, ASSIGNOR TO ECONOMY ENGINEERING COMPANY, OF CHICAGO, ILLINOIS, A CORPORATION OF ILLINOIS.

PORTABLE STACKING MACHINE.

Application filed July 26, 1922. Serial No. 577,563.

The invention relates to a machine adapted for use in warehouses, wharves, and like places, for the purpose of raising or lowering relatively heavy articles in the form of bags, boxes, bales, etc., in the operation of arranging such articles in tiers or stacks.

The primary object of the invention is to produce a machine of this general character which is capable of effectually accomplishing the desired results at a greatly reduced cost, as compared to prior methods employed.

One of the uses for which my invention is especially fitted is the stacking of sugar bags in enclosed freight cars. These bags weigh approximately 325 pounds, and when manual labor is employed, as has heretofore been the case, a large force of workmen is necessarily required and the operation is slow and exceedingly laborious. In view of the deficiencies thus encountered with prior methods, I have aimed to provide a machine which is especially adapted for the more efficient performance of work of this general character, by making the operation substantially automatic, thereby reducing materially the number of workmen necessary to be employed as well as the time and labor required; by arranging the parts so compactly that the machine is capable of use within the limited space provided within an enclosed freight car; and by the provision of controlling means exceedingly easy to manipulate without danger to the machine or the workmen in charge of the same.

A general but important object is the provision of a construction for the machine which is of a relatively simple character.

Herein for the sake of convenience the articles to be handled by the machine are referred to as sugar bags, but it will be obvious that the invention is not limited to any particular use nor to the particular construction and arrangement of the parts herein shown for it is contemplated that various changes may be made by those skilled in the art in the form, construction and arrangement of the parts without departing from the spirit and scope of the invention as expressed in the appended claims.

In carrying out my invention I provide a load carrier or support guided for up and down movement in a stationary upright guide frame under the driving power of a stationary motor which is suitably supported in the framework. Upon this frame is mounted a movable support or cradle carrying a platform which normally occupies a downwardly and forwardly inclined position for the convenience of the workmen in placing articles thereon or removing them therefrom. Upon the closing of the motor circuit by the operation of a push button or other manual switch, the cradle and its platform first assume a horizontal position and then, the cradle with the platform travels vertically to a predetermined height. When it reaches such height the hoisting motor is automatically stopped and a brake applied to sustain the elevated position of the load. Simultaneously a second motor is actuated to move the platform which is in the form of an endless conveyor laterally in its cradle, and at the same time, to revolve the conveyor so as to effect the discharge of the bag at the rear side of the machine. The platform now moves back to its initial position and its actuating motor is automatically stopped. Finally the brake is released and the first motor is again brought into action, but in a reverse direction, to lower the load support and platform rapidly to the initial position shown in Figs. 1, 2 and 6, whereupon the motor is automatically stopped.

Figure 2:
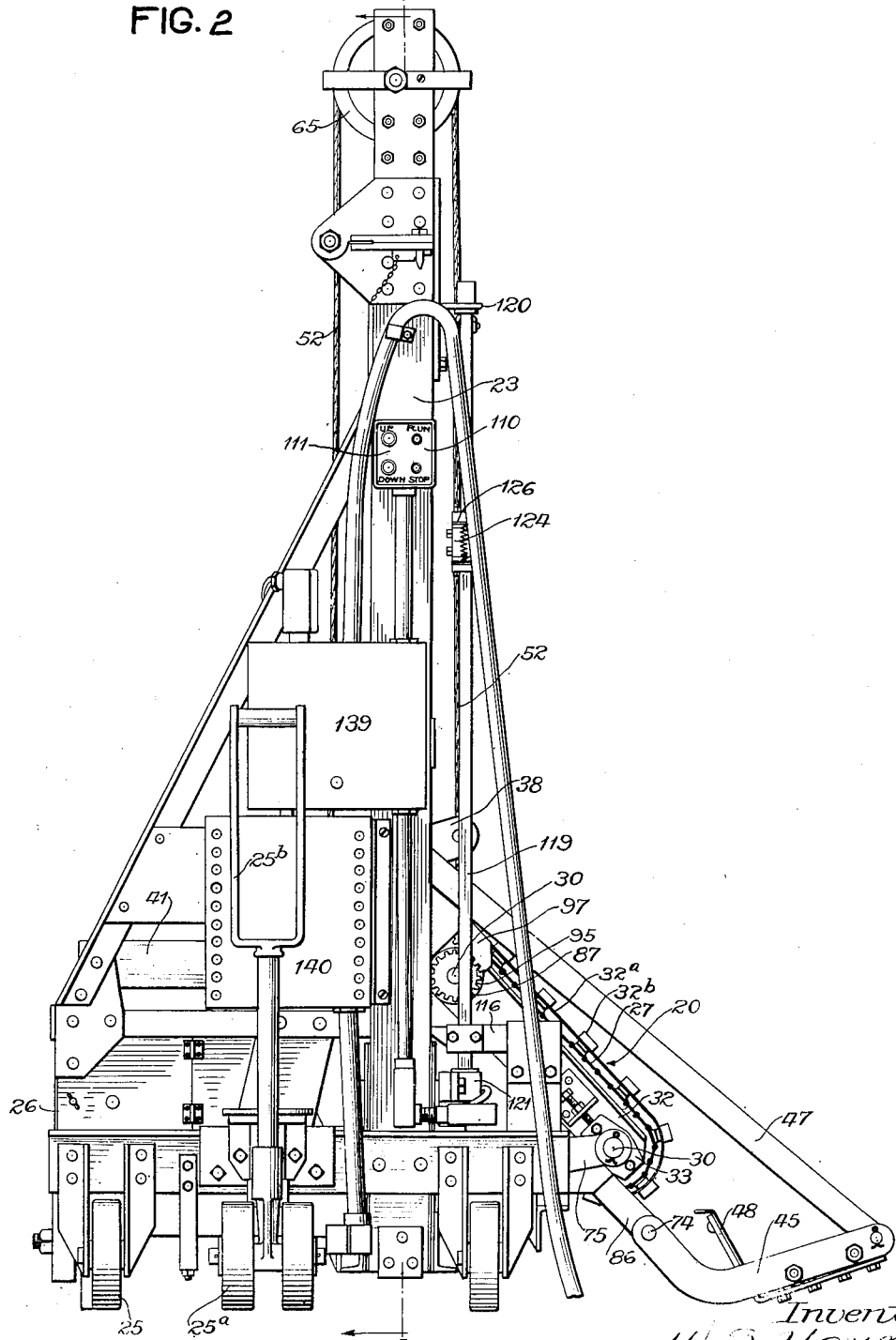
Figure 3:
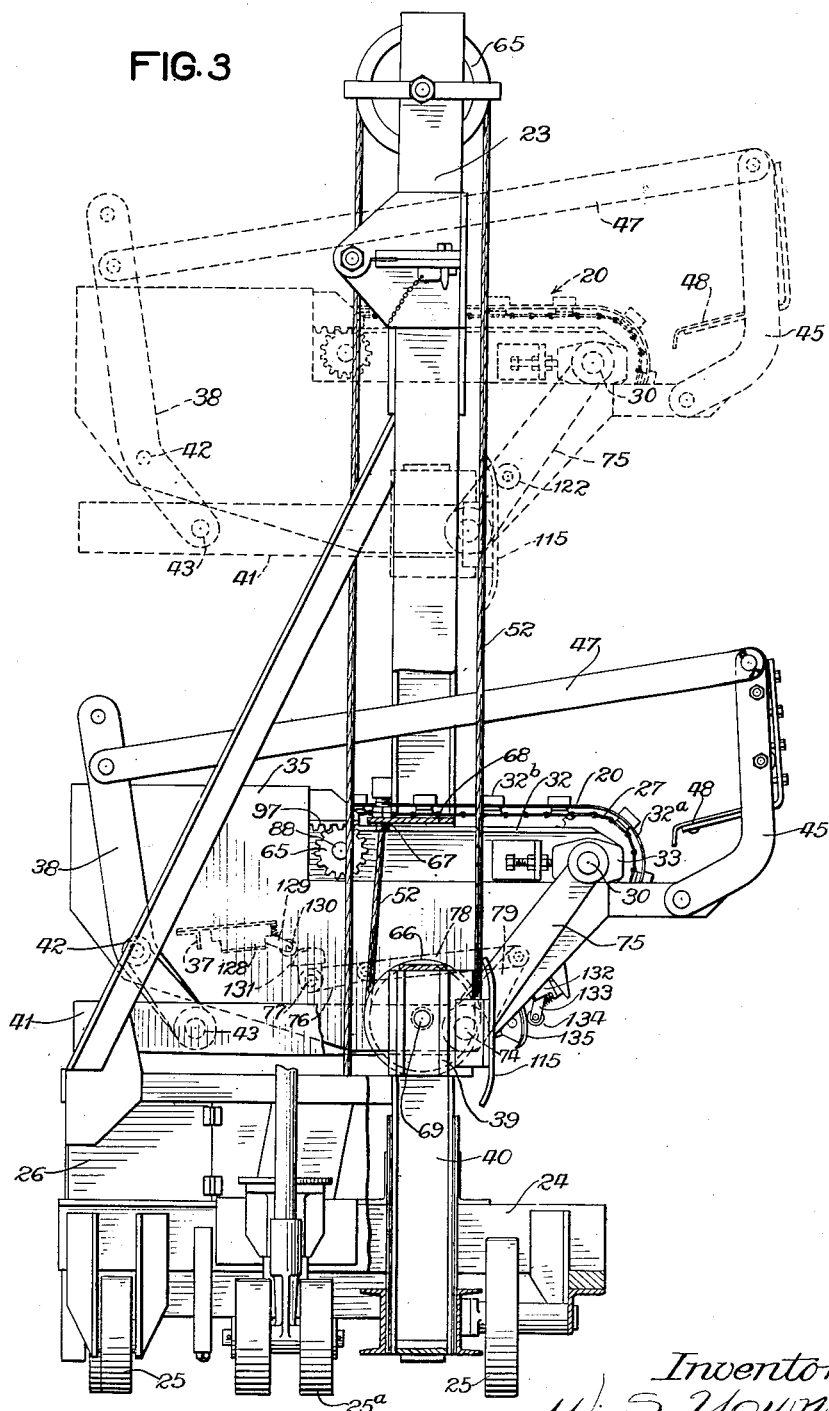
Figure 4:
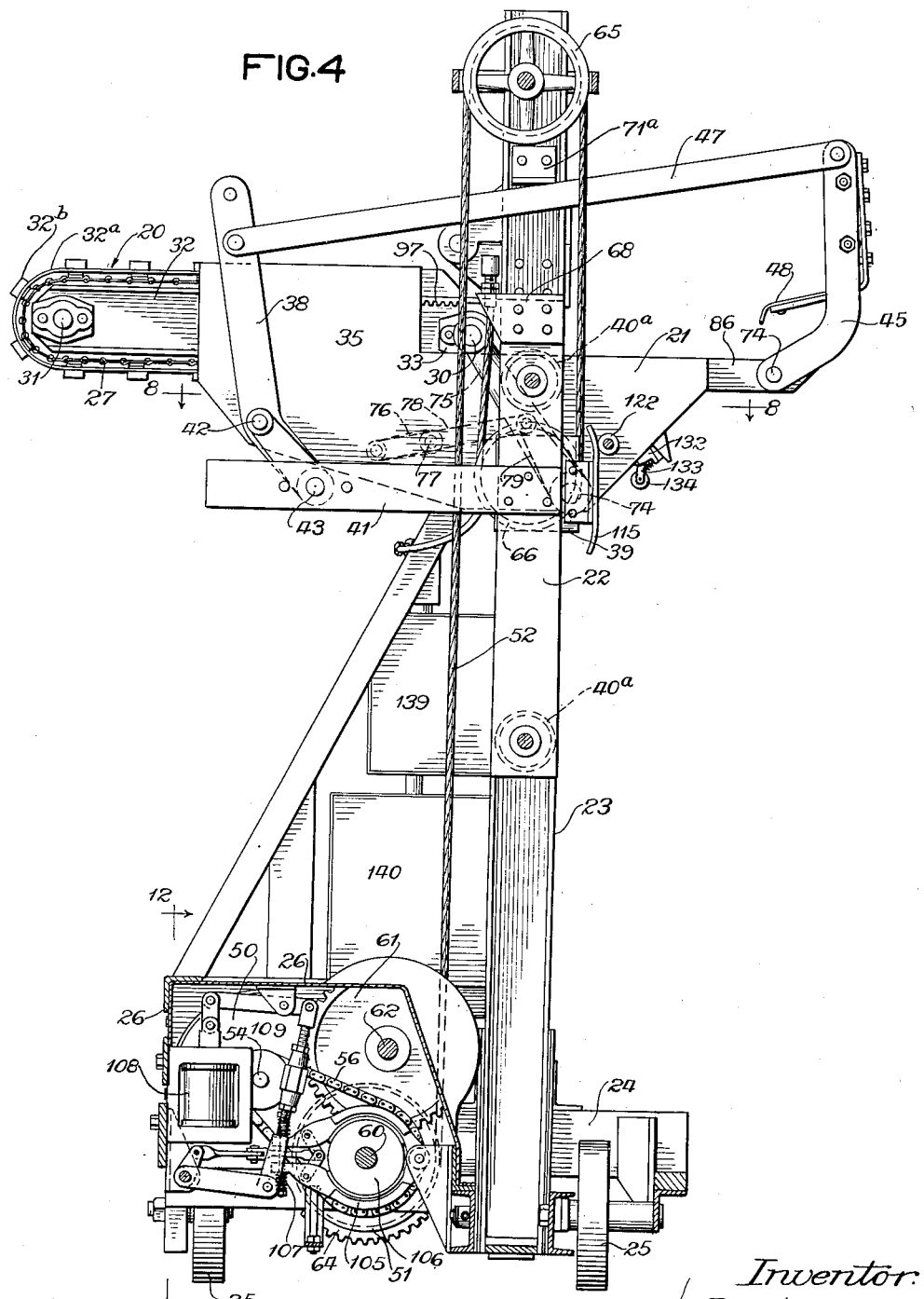
Figure 5:
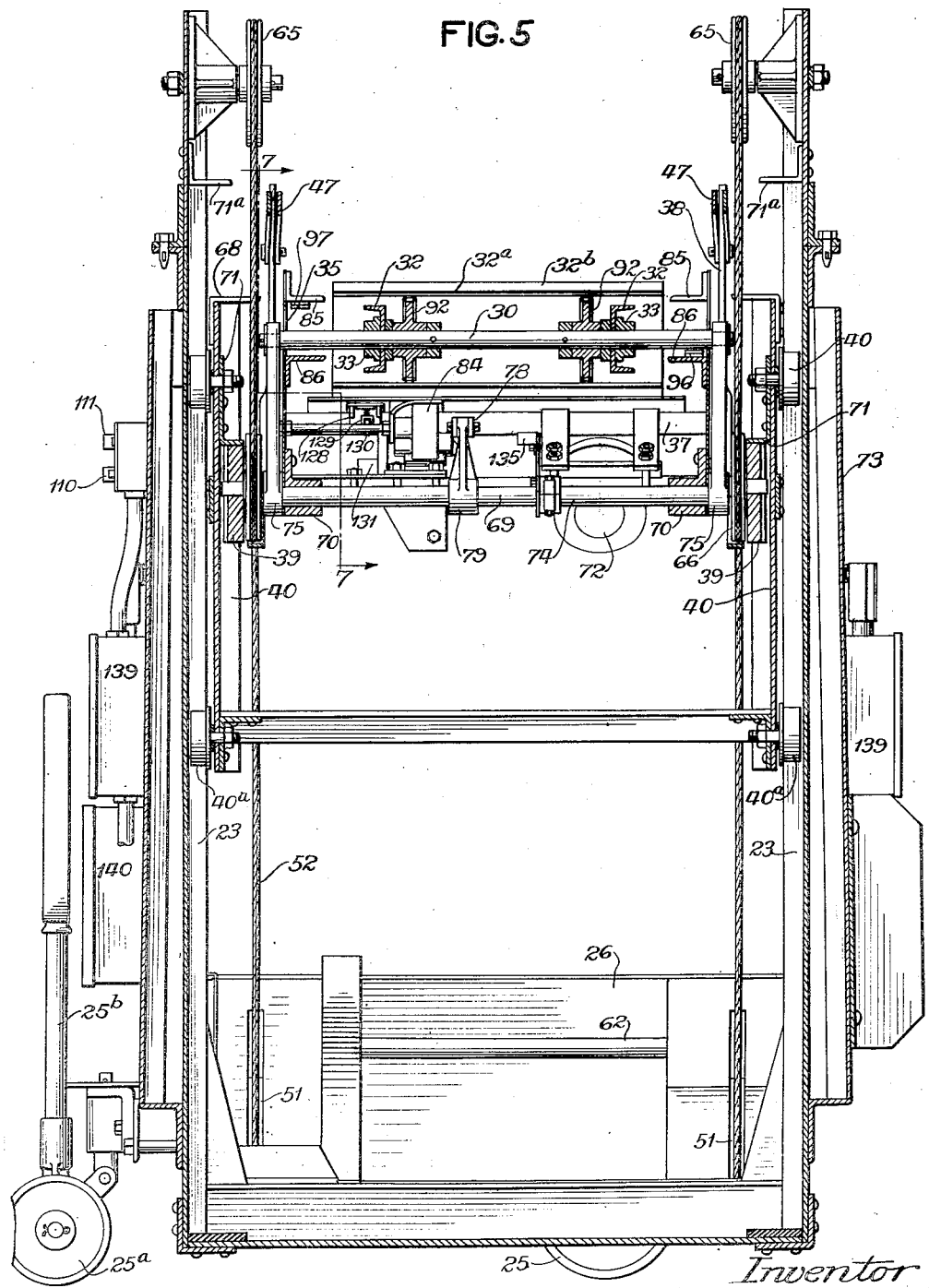
Figure 12:
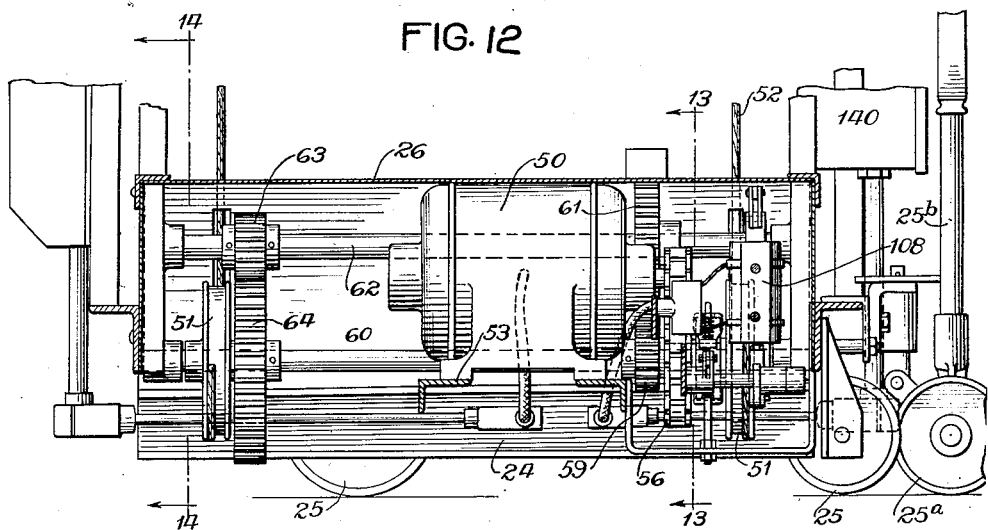
Figure 13:
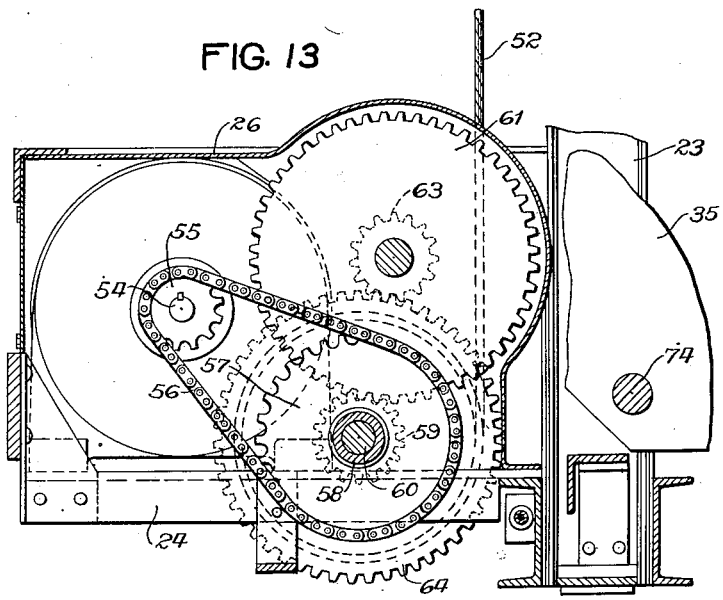

In the drawings, Figure 1 is a front view of a stacking machine embodying my invention. Fig. 2 is a side elevation of the machine. Fig. 3 is a similar view with parts broken away to show details of construction but showing the load support in different positions. Fig. 4 is a vertical sectional view taken in the plane of line 4—4 of Fig. 1. Fig. 5 is a vertical sectional view taken in the plane of line 5—5 of Fig. 2. Fig. 6 is a similar view taken in the plane of line 6—6 of Fig. 1. Fig. 7 is an enlarged vertical sectional view taken approximately in the plane of line 7—7 of Fig. 5. Fig. 8 is a horizontal sectional view taken in the plane of line 8—8 of Fig. 4. Fig. 9 is a horizontal sectional view through the load support taken in the plane of line 9—9 of Fig. 6. Fig. 10 is a fragmentary transverse sectional view taken in the plane of line 10—10 of Fig. 6. Fig. 11 is a fragmentary vertical sectional view illustrating the construction of an adjustable switch actuating device of the controlling mechanism. Fig. 12 is a fragmentary rear elevational view of the lower portion of the machine showing the hoist motor and operative connections, the housing enclosing these parts being shown in section. Fig. 13 is a vertical sectional view taken in the plane of line 13—13 of Fig. 12. Fig. 14 is a vertical sectional view taken in the plane of line 14—14 of Fig. 12, and showing details of the framework construction. Fig. 15 is a fragmentary elevation section illustrating the gear train of the driving mechanism. Fig. 16 is a horizontal sectional detail view illustrating one of the control switches. Fig. 17 is a fragmentary vertical sectional view showing another one of the control switches. Fig. 18 is a diagrammatic view showing the wiring system employed.

Referring now to the drawings, a load supporting platform 20 (Fig. 1) is mounted in a supporting frame or cradle 21 (Fig. 4) for bodily lateral movement in a front to rear direction, as well as for revolution therein, the platform comprising an endless conveyor. The cradle 21 in turn is pivotally mounted in a carrier 22 which is guided for vertical movement in an upright frame 23. This frame is supported in upright position upon a base frame 24 and comprises two pairs of channel bars secured together as shown in Fig. 1 (to the right) by plates 23ª. The innermost bars constitute the guide frame, the outer bars serving to strengthen the frame, and the upper ends of the inner bars may be made detachable to permit the machine to pass through exceptionally small doorways. The base frame is mounted upon wheels 25 in a well known manner so as to be capable of being readily portable, a steering wheel 25ª having a handle 25ᵇ being provided for this purpose. Enclosed within a housing 26 on the base frame is the hoisting and brake mechanism (Figs. 4 and 12).

The platform 20 initially occupies a position inclined downwardly and forwardly (Figs. 1, 2 and 6), with its forward end or toe resting upon the floor in order that a workman may easily position the sugar bag upon that platform or remove it therefrom, it being customary for the workman to convey the bag to be elevated to the machine by means of a two-wheeled hand truck of the well known type.

Referring now to Fig. 6, the platform 20, as already indicated, comprises an endless conveyor having the usual chains 27 running over sprockets 28 and 29 carried by shafts 30 and 31 which latter are mounted in channel bars 32. Slats 32ª are carried by the chains by means of an endless belt 32ᵇ. The bearing boxes 33 (Fig. 9) for the shaft 30 are mounted for adjustment by means of adjusting devices carried by the channel bars 32 so as to vary the tension on the platform belt.

The cradle 21 by which the platform 20 is carried comprises side frame members 35 connected by forward and rear angle bars 36 and 37 (Figs. 7 and 8); and the cradle is pivoted near its rear end on the carrier 22 through the medium of rear levers 38, and near its forward end is slidably supported in the carrier by means of shoes 39. For this purpose the carrier comprises an upright frame consisting of a pair of spaced inwardly opening channel bars 40 adapted to receive the shoes, and a horizontal portion consisting of a pair of arms 41 rigid with the side frame members 40. The channel bars carry at their upper and lower ends rollers 40ª adapted to operate in the guide frame 23. The levers 38 are pivotally mounted between their ends upon a shaft 42 extending through the side members 35 of the cradle 21; and at their lower ends they are pivotally mounted upon a shaft 43 journaled at its opposite ends in bearings 44 (Fig. 8) carried by the arms 41 of the carrier 22.

The forward or toe end of the cradle 21 has pivoted thereto a pair of bent arms 45 upon a rod 46, and these arms extend first downwardly and then forwardly and are connected at their free ends by links 47 with the free ends of the levers 38.

By the construction shown, when upward movement is imparted to the shoes 39, the cradle 21 is initially swung upon the levers 38 from its forward and downwardly inclined position into a horizontal position as shown in Fig. 3. In this movement, by reason of the connection of the arms 45 with the levers 38 the former are drawn upwardly into a substantially vertical position and the bag supported by the platform 20 is given an initial rearward movement onto the platform. The toe of the support, therefore, facilitates the discharge of the bag from the platform. Moreover, it serves to retain the bag in position upon the platform when the latter is swung from its forward inclined position into the horizontal position. To further facilitate the positioning of the bag upon the platform, I preferably provide a supporting member 48 made rigid with the arms 45 through the medium of transverse connecting rods 49. This member is so positioned as to prevent the front end of the bag from sagging into the space forwardly of the platform 20.

The hoisting means for imparting such initial movement to the cradle 21 and the platform 20 mounted therein, as well as the subsequent elevation of the support and its platform comprises in the present instance a motor 50 which is operatively connected with one or more winding drums 51 for cables 52 connected with the load support. The motor 50 is suitably supported within the base frame 24 as upon horizontal bars 53, and within the housing 26. Its shaft 54 carries rigidly secured thereto a sprocket pinion 55 connected by means of a chain 56 with a sprocket 57. The latter is fast upon a sleeve 58 with which is rigid a pinion 59, said sleeve and pinion being journaled upon a shaft 60 which carries the winding drums 51 near its opposite ends. The pinion 59 meshes with a spur gear 61 fast upon a shaft 62 parallel to the shaft 60 and near the opposite end of the latter shaft 61 is a pinion 63 meshing with a spur gear 64 fast upon the end of the shaft 60 opposite the motor (Figs. 12 and 15).

Each of the cables 52 is made fast at one end upon one of the winding drums 51, and after passing over a sheave 65 mounted in a suitable manner at the upper end of the upright frame 23, extends downwardly and thence around a sheave 66 which has a guide member 66ᵃ for the cable. The latter is finally made fast at its opposite end to the carrier frame 22 as at 67. Said frame has at the upper end of its upright portion 40 a cross piece 68 for this purpose. The sheaves 66 are journaled upon the opposite ends of a shaft 69 carried in bearing brackets 70 (Fig. 8) upon the inner sides of the side frame members 35 of the cradle; and the extreme ends of said shaft carry the shoes 39 which slide in the upright bars 40 of the carrier frame 22. Stop members 71 (Fig. 5) are secured within the bars 40 to limit the upward movement of the shoes therein, and these stops are so arranged that in the initial operation of swinging the support and platform from the inclined position into the horizontal position, the shoes contact with the stops at the end of the operation, that is, when the platform occupies a horizontal position. Therefore, in the continued operation of the hoisting mechanism, the carrier frame 22 is elevated bodily so as to carry the support 21 and platform to the desired position of vertical adjustment (Fig. 3), the extent of elevation being limited as by means of stop members 71ᵃ upon the inner side of the frame 23.

When such position of the platform has been attained, the next operation is to actuate the platform to effect the discharge of the bag therefrom and deposit it either upon the floor (in the case of the first bag) or upon the top of a stack of bags located upon the rear side of the machine. For this purpose a second actuating motor is employed, which for convenience is called the platform motor. This motor is designated by the numeral 72 and is carried beneath the platform upon a suitable supporting framework 73 mounted between the side frame members 35 of the cradle 21. This motor is operatively connected with the platform so as to actuate it both to effect the lateral movement thereof as well as to revolve the same.

The means which I prefer to employ to accomplish this result will now be described.

Referring now to Figs. 5 to 8 in particular, 74 designates a rock shaft journaled at its opposite ends in the bearing brackets 70 carried by the side members 35 of the cradle. The opposite ends of this shaft extend through said side members 35 and have fixed thereon levers 75 the upper ends of which are pivotally connected to the cross shaft 30 of the platform 20 (Fig. 5). This shaft, which it will be remembered is journaled in bearing boxes 33 carried by the channel bars 32 of the platform frame, extends beyond the side members which are cut away at their forward ends to permit of the oscillation of the shaft to impart a reciprocatory motion to the platform.

The operative connection between the motor 72 and the shaft 74 to oscillate the latter comprises in the present instance a crank arm 76 fast upon a shaft 77 connected by means of a link 78 with an arm 79 fast upon the shaft 74; and the shaft 77 which is journaled in a suitable bearing bracket 80 has a worm wheel 81 thereon meshing with a worm 82 (Fig. 7). The latter is connected by a chain and sprocket mechanism 83 with the shaft of the motor 72. The worm and worm wheel are enclosed within a housing 84 carried by the framework of the cradle.

In the reciprocation of the platform the cradle remains stationary and the relative movement between these two elements of the machine is utilized to revolve the endless conveyor of the platform 20. To this end the side members 35 of the cradle carry upper and lower angle irons or bars 85 and 86 spaced a short distance apart vertically so as to receive between them rollers 87 journaled upon the opposite ends of a shaft 88 extending transversely of the platform frame substantially midway between the shafts 30 and 31 (Fig. 9) and journaled near its opposite ends in bearings 89 carried by the channel bars 32. This shaft 88 is arranged to be rotated by power derived from the reciprocation of the platform through clutch devices to be presently described, and power is transmitted from the shaft to the platform by means of a chain and sprocket connection 90 with the forward shaft 31 of the platform. The latter has rigid therewith sprocket wheels 91 over which the conveyor chains 27 operate. The shaft 30 at the rear end of the platform has similar sprocket wheels 92 for carrying the chains 27. The bearings 89 are adjustable by means of devices 93 to vary the tension upon the chain 90 as desired.

The opposite ends of the shaft 88 carry pinions 94 and 95 rotatable thereon and adapted to mesh respectively with racks 96 and 97, the former being carried by the lower angle bar 86 and the latter by the upper bar 85 (Fig. 5). The rollers 87 are located adjacent the pinions 94 and 95; and rigid with each of the pinions is a clutch sleeve 98 also loose upon the shaft and carrying a collar 99 adjacent the inner side of the roller. Said sleeve 98 is adapted to engage with a clutch sleeve 100. These sleeves are provided with interengaging teeth 101 having inclined faces, but the inclination of such faces at opposite sides of the platform is in opposite directions. The clutch sleeve 100 has a flange 102 forming a friction disk which is adapted frictionally to engage a second disk 103 which is fast upon the shaft 88, a suitable friction member or washer 104 being interposed between the two disks. The sleeves 98 and 100 and the disk 102 are normally loose upon the shaft. When, however, the pinions 94 or 95 are rotated in a direction to force the clutch faces into engagement, the pinions are made rigid with the shaft through the friction disks 102 and 103 so that rotation is imparted to the shaft.

It will be evident that as the platform is moved outwardly the pinion 94, meshing with the rack 96 upon the lower angle bar 86, will cause the pinion to rotate in a direction to revolve the conveyor to the left (Fig. 9); and by reason of the opposite inclination of the clutch faces, such rotation of the pinion 94 forces the corresponding disk 102 into holding engagement with the disk 103 and thus effects a rigid connection between the pinion and the shaft. On the other hand, the pinion 95 in such operative movement of the platform rotates in the opposite direction, and thus renders the clutch connection at this side of the platform inoperative. Upon the return movement of the platform, however, the operation is reversed, that is to say, the pinion 95 is rotated in a direction to effect connection between it and the shaft, whereas the pinion 94 is rotated to disconnect it from the shaft. The result is that the bodily movements of the platform in opposite directions serves to impart a revolving motion to the conveyor always in the same direction.

An automatic brake mechanism is provided to sustain the load support or cradle at the desired elevation while the platform is being actuated to discharge the load therefrom. This brake mechanism may be of any suitable construction. Herein I have shown (Fig. 4) a brake band 105 normally forced into engagement with a brake drum 106 on the shaft 60 by means of coiled compression springs 107. An electromagnet 108 is connected in circuit with the hoist motor and is operatively connected with the brake band by a link and lever mechanism 109 so that when the motor is in operation and the electromagnet energized, the brake band is released from the drum.

In a convenient location, herein upon one side of the upright frame 23 of the machine, I provide a manual control station from which the operation of the machine may be readily governed by a single workman. This station includes "run" and "stop" switches 110 and "up" and "down" switches 111; and through the manipulation of these switches the platform may be elevated to any desired height and stopped at any point at the will of the operator. In addition to these manual switches I provide automatically operating switches for limiting the upward movement or travel of the cradle; for starting and stopping the platform actuating motor; for re-starting the hoisting motor to cause the descent of the cradle; and finally for stopping the hoisting motor when the cradle and its platform reaches the downward limit of movement.

Referring to the diagrammatic view in Fig. 18, these manual and automatic switches and their connections in the control system are shown in connection with a supply system, the motors being of the three-phase type. Thus I have shown the manual control station as having "run" and "stop" switches 110 and "up" and "down" switches 111. The switches 110 comprise a pair of knife blades 110ª operatively connected so as to move in unison when either of the two buttons are actuated, but the switches 111 are operable independently to control the up and down circuits. 112 designates a switch which is arranged to limit the upward movement of the platform and also to control the operation of the latter to discharge the load. Normally it is closed so that when the "up" button at the manual control station is operated, the circuit is closed with the hoist motor 50 through the medium of suitable governing devices (not shown) of a panel board 113 to elevate the load. When the latter attains a predetermined height, means is brought into action to actuate the switch 112, open the hoist motor circuit and close the circuit, also by control devices on a panel board 114, with the platform motor 72. The means for thus opening the hoist motor circuit and closing the platform circuit is shown in Figs. 16 and 17 as comprising a cam member 115 rigid with the shoe 39 at one side of the upright frame, and an arm 116 which is arranged to be swung to actuate a lever 117 carrying a roller 118, of the switch 112. The arm 116 is mounted upon a vertical rock shaft 119 (Figs. 1 and 16) which is mounted at its upper end in a bracket 120 carried by the frame 23 and at its lower end is pivotally supported in a bearing 121 also carried by the framework. Oscillation of the shaft 119 is effected by the cam member 115 through the medium of a roller 122 carried by an arm 123 on a block 124 which is adjustable up and down upon the shaft 119. preferably the latter is made square and is frictionally held against up and down movement by a pair of spring pressed apertured plates 126 (Fig. 11). Referring to Fig. 1, it will be seen that when the cam 115 which initially occupies a position near the lower end of the framework engages the roller 122, which may occupy any desired height within the will of the operator, the shaft 119 will be swung against the action of the spring 127 (Fig. 16) to swing the arm 116 and thereby the lever 117 of the switch 112 opening the hoist motor circuit and closing the platform motor circuit.

When the platform under the operation of the platform motor has been moved to its extreme rearward position (Fig. 4) and returned, a switch 128 is actuated to close the down circuit of the hoist motor 50 through the panel board 113. This switch comprises an operating lever 129 carrying a roller 130 and is arranged to be actuated by a cam member 131 fast upon the worm gear shaft 77 (Figs. 7 and 8), the arrangement being such that when the platform has reached its foremost position upon the return movement thereof, the cam 131 engages the roller 130 and closes the down motor circuit.

In order to insure that the platform cannot be lowered until it has reached its rearmost position, I provide a second switch 132 which normally maintains the down motor circuit open while the platform is being moved outwardly and returned in the discharge of the load. This switch comprises a lever 133 carrying a roller 134 and adapted to be engaged by a cam 135 fast upon the shaft 74. The arrangement is such that before the platform may descend by the closing of the switch 128, the switch 132 must be closed.

The switch for opening the down motor circuit, when the lower limit of travel has been reached, is designated by the numeral 136 and comprises (Fig. 17) a lever 137 having a roller 138 thereon interposed in the path of travel of the cam 115. Normally the circuit through this switch is closed, and when the cam, as the cradle reaches the downward limit of its movement, engages the roller 138, the down motor circuit is broken.

As the cradle moved downwardly from its elevated position the cam 115 moved away from the roller 118, opened the platform motor circuit to stop the motor 72 and closed the hoist motor circuit. Consequently, when it is desired to operate the machine through another cycle of movement, it is only necessary for the operator to close the hoist motor circuit through the manipulation of the "up" button at the manual control station. It is to be observed, however, that the operation of the "up" button to close the up circuit is ineffective to start the motor 50 except when the switch 112 is in its normal closed position.

If for any reason it is desired to stop the machine after the elevation of the load has commenced, or at any point before the cradle reaches its downward or initial position, it is only necessary for the attendant to operate the "stop" button at the manual control station, and then when it is desired to continue the operation of the machine, he just pushes the "run" button and then the "up" or "down" button is operated according to the direction of movement desired The electrical control mechanism per se including the construction of the switch devices, is of a well known character forming no part of this invention except as these devices are herein employed in combination with the raising and lowering mechanism to control its operation. The particular method of electrically connecting the various elements of the system therefore need not be described in detail. 139 and 140 designate boxes at each side of the machine enclosing the panel boards 113 and 114 and other control devices.

In the operation of the machine a workman deposits a sugar bag, or other article to be stacked, upon the platform in the cradle 21 (Figs. 1 and 2). In this position the toe of the cradle occupies a position substantially flat upon the floor, and the forward or lower end of the bag is supported by the member 48. The operator now actuates the "up" button of the switch 111, whereupon the hoist motor 50 is actuated to wind the cables 52 in a direction to elevate the load. Initially, the cradle is swung from its downwardly inclined position upon the levers 38 swinging on the shaft 43 into an elevated horizontal position. Simultaneously the levers 38 swing upon the shaft 42 as an axis and cause the arms 45 to swing into an upright or substantially vertical position. In this movement of the arms 45 the bag is given an initial rearward movement upon the platform 20.

The continued upward movement of the forward end of the cradle causes the shoe 39 to engage the stop member 71 in the carrier frame 40 so that the frame also moves upwardly. This upward movement continues until the motor is stopped through the operation of the switch 112 opening the hoist motor circuit and closing the platform motor circuit. The opening of the hoist motor circuit cuts out the brake magnet and so permits the brake to be applied to sustain the load.

Movement is now imparted to the platform through the oscillation of the shaft 74 by the worm drive mechanism 81—82 and through the levers 75 which are connected with the platform frame. In such reciprocation of the platform by the motor 72, the pinions 94 and 95 are successively actuated by their engagement with the racks 96 and 97 to impart rotation to the shaft 88 through the respective clutch devices upon the opposite sides of the frame.

As the platform approaches its rearmost position in the cradle, the switch 128 is actuated to close the down motor circuit but before the motor can operate, the switch 132 must be actuated and this occurs immediately upon the positioning of the platform in its rearmost position. Upon the closing of the down motor circuit the solenoid of the brake 108 is actuated and the brake released. Thereupon the motor 50 operates to wind the cables 52 in the reverse direction to move the cradle positively and rapidly to its downward limit of movement. When the latter position is attained, the down motor circuit is broken through the operation of the switch 136 by the cam 115.

The entire operation of lifting and discharging an article to be stacked requires but a few seconds. This compares with a large expenditure of time in case the operation is performed manually, and the number of attendants required is also materially reduced. The construction and arrangement of the parts is such that it occupies very little space as will be apparent from the fact that a machine constructed in accordance with the invention herein shown and described has been successfully used within an enclosed freight car. The automatic control mechanism which enables the attainment of the high speed is of a simple and dependable character, and the manual controls provided, by means of which the machine is at all times within the absolute control of the attendant renders the wide usage of the machine practical, it being unnecessary to employ highly skilled workmen. A feature of especial merit is the construction which enables the platform to be reciprocated bodily as well as revolved, by the use of a single motor. Also I deem the positive downward actuation of the load support as well as the upward movement thereof of substantial importance by reason of the fact that high speed of operation is thereby made possible.

I claim as my invention:

1. A raising and lowering machine comprising, in combination with a stationary upright frame, a load-supporting platform, a cradle guided for up and down movements in the frame and movably supporting the platform, and motive power means for elevating the cradle with its platform and imparting endwise bodily movement to the platform.

2. A raising and lowering machine comprising, in combination, a vertically movable support, a cradle pivotally mounted in said support, and a platform slidably mounted in the cradle.

3. A machine of the character described comprising, in combination, an upright guide frame, a support mounted for up and down movement in said frame, a cradle tiltably mounted on said support, and a platform movably mounted in the cradle.

4. A machine of the character described comprising, in combination, an upright guide frame, a support mounted for up and down movement in said frame, a cradle tiltably mounted on said support, and a platform movably mounted in the cradle, said cradle with its platform being movable from a downwardly inclined position into a horizontal position.

5. An apparatus of the character described having a vertically movable cradle, and a platform mounted for endwise bodily movement in the cradle and including a separately movable load support.

6. An apparatus of the character described having a vertically movable support, a cradle mounted in said support, and a platform bodily movable in said cradle and including an endless conveyor.

7. A machine of the character described comprising, in combination, a support, a shoe guided for up and down movements in said support, a cradle pivotally mounted on the support and pivotally connected to said shoe whereby in the up and down movement of the shoe relative to said support the cradle is rocked from an initial inclined position into a horizontal position or vice versa.

8. A machine of the character described comprising, in combination, a support, a cradle pivotally mounted at one end on the support and having its other end guided for up and down movements, the arrangement being such that in such up and down movements the cradle is rocked from an initial inclined position into a horizontal position or vice versa, and a platform mounted in the cradle.

9. A machine of the character described comprising, in combination, a frame, a support guided by the frame for up and down movements, a shoe guided for movement in said support, a cradle pivotally mounted in the support and operatively connected to said shoe whereby in the up and down movements of the shoe relative to said support the cradle is rocked from an initial inclined position into a horizontal position and vice versa, and a load support mounted in the cradle.

10. A machine of the character described comprising a vertically movable support, a cradle pivotally mounted in the support, a platform mounted for endwise bodily movement in the cradle, said cradle being operable from a forward inclined position to an elevated horizontal position, and means operable, in such movement of the cradle, into a position to hold an article supported upon the platform against endwise movement thereof.

11. In a machine of the class described, the combination of a support, a cradle having one end pivotally mounted in the support and its other end slidably mounted in the support, a platform movable endwise in the cradle, and means operable in the movement of the cradle from a forward inclined position into a horizontal position to impart an initial movement to an article carried by the platform.

12. In a machine of the character described, a cradle having an endwise movable platform therein, an arm pivotally mounted at one end of the cradle, a lever pivoted to the opposite end of the cradle, a link connecting said arm and lever, and means for rocking the lever to swing said arm from an initial position away from the cradle toward the cradle.

13. In a machine of the class described, the combination of a cradle, a platform mounted for endwise bodily movement in the cradle, means for supporting one end of an article placed upon the platform, and means for rocking the cradle, said supporting means being operable from a forwardly projecting position into a substantially upright position in the rocking movements of the cradle.

14. In a machine of the class described, the combination of a cradle, a platform mounted for endwise bodily movement in the cradle, arms for supporting one end of an article placed upon the platform, means for rocking the cradle, said arms being operable in the rocking movement of the cradle from a forward position into a substantially upright position, and means carried by said arms for supporting one end of the article to facilitate its movement onto the platform.

15. The combination of a support, a shoe guided for up and down movement in said support, a cradle pivotally connected at one end to said shoe and at its other end to the support, and means for raising and lowering the shoe.

16. In a machine of the class described, an upright guide frame, a support mounted for up and down movement in said frame, a cradle having one end guided for up and down movement in said support and its other end swingable therein, and means for raising or lowering the support in said guide frame.

17. In a machine of the class described, an upright guide frame, a support mounted for up and down movement in said frame, a cradle having one end guided for up and down movement in said support and its other end pivotally supported thereby, and means for raising said member in said support and thereby imparting vertical movement to the support.

18. In a machine of the class described, the combination of a horizontal base frame, a stationary upright guide frame, a support mounted for up and down movement in said frame, a cradle tiltably mounted in said support, and a platform mounted for endwise bodily movement in the cradle.

19. In a machine of the class described, the combination of a horizontal base frame, a stationary upright guide frame, a support mounted for up and down movement in said frame, a cradle tiltably mounted in said support, and an endless conveyor constituting a platform and mounted for endwise bodily movement in the cradle.

20. In a machine of the class described, the combination of a horizontal base frame, a stationary upright guide frame, a support mounted for up and down movement in said frame, a cradle tiltably mounted in said support, an endless conveyor constituting a platform and mounted for endwise bodily movement in the cradle, and means for actuating the conveyor.

21. A raising or lowering machine comprising an upright guide frame, a support guided for up and down movement in said frame, an endless conveyor constituting a platform and mounted for bodily endwise movement in said support, and means for raising and lowering the support.

22. A raising or lowering machine comprising an upright guide frame, a support guided for up and down movement in said frame, an endless conveyor carried by said support and mounted for bodily endwise lateral movement, and means also carried by the support for actuating said conveyor.

23. In a raising or lowering machine, the combination of a support mounted for up and down movement, a platform mounted for endwise bodily movement including a separately movable load support, and means carried by the support for actuating the platform and its load support.

24. In a raising or lowering machine, the combination of a support mounted for up and down movement, a platform mounted for endwise bodily movement and including an endless conveyor, and means carried by the support and including an electric motor for actuating the platform and its conveyor.

25. In a machine of the class described, the combination of a vertically movable frame, a platform mounted for endwise bodily movement in said frame, and motive power means carried by the frame for reciprocating the platform.

26. In a machine of the class described, the combination of a vertically movable frame, a platform mounted for endwise bodily movement in said frame, and means carried by the frame for reciprocating the platform; said means comprising an electric motor, a rock shaft, a lever connected with the platform and arranged to be actuated by the shaft, and means operatively connecting the motor with said shaft to rock it.

27. In a machine of the class described, means for supporting the platform for endwise bodily movement comprising pairs of spaced parallel bars forming guideways for the platform, said platform having a shaft with rollers at its opposite ends mounted in said guideways, and means for reciprocating the platform including a rock shaft, and a lever carried by said shaft and pivotally connected to the platform.

28. In a machine of the class described, the combination of a supporting frame having opposite guideways, an endless conveyor having a shaft with its opposite ends extending into said guideways, means for reciprocating the platform, and means at the opposite ends of said shaft for effecting the rotation of the latter in the same direction when the platform is reciprocated.

29. In a machine of the class described, the combination of an endless conveyor mounted for endwise bodily movement, and means for revolving the conveyor in the same direction when the platform is reciprocated, said means including a shaft to be driven, a pinion at each end of the shaft, racks with which said pinions are arranged to mesh, and a clutch device for each of said pinions comprising a pair of clutch collars loose upon the shaft and having interengaging teeth with inclined faces, and a pair of friction disks one of which is fast upon the shaft and the other of which is rigid with one of said clutch collars whereby when the pinion rotates in one direction a connection is effected between it and the shaft through the clutch collars and friction disks, and when the pinion is rotated in the opposite direction the shaft is disconnected from the pinion.

30. A raising or lowering apparatus comprising a vertically movable support, a platform carried by said support, means for elevating the support including an electric motor, brake means, and means operable when the support reaches a predetermined height to stop the motor and simultaneously apply the brake device to hold the support in its elevated position, said means comprising a switch, a vertically disposed rock shaft operatively associated with the switch to operate it, and means adjustable on said shaft and arranged to be actuated by said support in its up and down movements.

31. A raising or lowering machine comprising a platform mounted for up and down movement, a motor for elevating the platform, means for imparting an endwise bodily movement to the platform including a second motor, and means operable when the platform attains a predetermined height to stop the elevating motor and start the platform motor.

32. In a machine of the class described, the combination of a platform, a vertically movable frame in which said platform is mounted for endwise bodily movement, means for elevating the frame including an electric motor, a second motor carried by the frame for actuating the platform, and automatic actuating means operable to stop the elevating motor when the platform attains a predetermined height and simultaneously start the platform actuating motor, and vice versa when the load has been discharged from the platform.

33. A raising or lowering machine comprising a load support mounted for up and down movement and including an endwise movable platform, means including an electric motor for raising and lowering the platform, means for actuating the platform including a second motor, and automatically actuating control devices operable when the platform attains a predetermined height to stop the elevating motor and start the platform motor, and when the platform attains its initial position to stop its motor and start the elevating motor but in the reverse direction to lower the platform.

34. A raising or lowering machine comprising a load support mounted for up and down movement and including an endwise movable platform, means including an electric motor for raising and lowering the platform, means for actuating the platform including a second motor, automatically actuating control devices operable when the platform attains a predetermined height to stop the elevating motor and start the platform motor and when the platform attains its initial position to stop its motor and start the elevating motor but in a reverse direction to lower the platform, and means for automatically stopping the main motor when the platform reaches its lowermost position.

35. A raising or lowering machine comprising a vertically movable support mounted for endwise lateral movement, means for raising and lowering the support including an electric motor, means for actuating the platform including a second motor, and automatic control devices for said motors whereby the load support travels to a predetermined height, discharges its load and descends to an initial position.

36. A raising or lowering machine comprising a vertically movable support mounted for endwise lateral movement, means for raising and lowering the support including an electric motor, means for actuating the platform including a second motor, automatic control devices for said motors whereby the load support travels to a predetermined height, discharges its load and descends to an initial position, and manual control means for starting and stopping the platform independently of the automatic control devices.

37. In a machine of the character described, a load support, means for raising and lowering the load support, means for imparting endwise bodily movement to the support including an electric motor, and means acting automatically when the support attains a predetermined height to start said motor.

38. In a machine of the character described, a load support, means for raising and lowering the load support, means for imparting endwise bodily movement to the support including an electric motor, and means acting automatically when the support attains a predetermined height to start said motor and when the platform attains its initial position to stop the motor.

39. In a raising and lowering machine, a platform mounted for up and down movements, and means for actuating the platform operable automatically when the platform is raised to a predetermined height to effect the discharge of the load thereon.

40. In a raising and lowering machine, a platform, means for actuating the platform to effect the discharge of the load thereon including an electric motor, and means automatically operable when the platform attains predetermined positions to effect the starting and stopping of its actuating motor.

41. In a machine of the class described, a load carrying platform, a frame in which said platform is mounted, means for raising and lowering said frame including an electric motor, means for actuating the platform including a second motor, and automatic devices operable when the platform attains predetermined positions to stop or start the elevating motor and to start or stop the platform motor.

42. In a machine of the class described, a load-carrying platform, a frame in which said platform is mounted, means for raising and lowering said frame including an electric motor, means for actuating the platform including a second motor, automatic devices operable when the platform attains predetermined positions to stop or start the elevating motor and to start or stop the platform motor, and a safety control device for insuring that the platform has attained its initial position before the descent of the frame commences.

43. A raising or lowering machine comprising a support mounted for up and down movement, means including an electric motor for raising and lowering the support, switch devices for opening the circuit at the opposite ends of such movement of the support, and means movable with the support to actuate both of said switch devices.

44. A raising or lowering machine comprising a support mounted for up and down movement, means including an electric motor for raising and lowering the support, switch devices for opening the circuit at the opposite ends of such movement of the support, and means movable with the support to actuate both of said switch devices, the means for actuating the switch device to limit the upward movement of the support including a rock shaft and a vertically adjustable member on said shaft arranged to be engaged by said cam member.

45. In a raising or lowering machine, a vertically movable support, means including an electric motor for elevating the support, a switch device operable automatically to stop the motor, and means for actuating the switch device when the support attains a predetermined height including a member movable with the support, an upright rock shaft, and a vertically adjustable device on said shaft adapted to be engaged by said member.

46. A machine of the character described comprising an upright frame, a load support mounted for up and down and bodily endwise movements relative to said frame, and electric motive power means for moving the platform comprising two electric circuits, switches for controlling each of said circuits, and means operable simultaneously to open one of said circuits and close the other one of said circuits.

47. In a machine of the character described, the combination of a load support mounted for up and down and bodily endwise movements, means operating to elevate said support, and means automatically operable when the support attains a predetermined height to cause it to impart an endwise movement thereto.

48. In a machine of the character described, the combination of a load support mounted for up and down and bodily endwise movements, means operating to elevate said support, and means automatically operable when the support attains a predetermined height to cause it to impart an endwise movement thereto, said support including an endless conveyor revoluble as an incident to its endwise movement.

49. In a machine of the character described, the combination of a platform mounted for vertical and bodily endwise movements, means for imparting vertical movements to the platform, and means operable automatically when the platform reaches a predetermined position in its vertical movements to impart endwise movements thereto, said platform including a separately movable load support adapted to operate as an incident to such endwise movement of the platform.

50. A machine of the character described comprising, in combination, an upright frame, a platform, and means operable to raise and lower the platform in said frame, said platform normally having a downwardly and forwardly inclined position, and said operating means being adapted to swing the platform in a horizontal position before starting its upward movement.

51. A machine of the character described comprising an upright frame, a platform, a carrier for the platform mounted for up and down movements in the frame, a support for the platform mounted in said carrier and having a limited movement relative thereto to permit the carrier to swing from an inclined position to a horizontal position and vice versa, and means for initially swinging the platform from its inclined position to a horizontal position and then elevating the carrier with the platform in such horizontal position.

52. A machine of the character described comprising, in combination, an upright frame, a platform mounted for up and down movements in said frame and including an endless conveyor, and means automatically operable as the platform reaches a predetermined height to actuate said conveyor.

53. In a machine of the character described, the combination of a platform mounted for up and down movements and also for bodily endwise movement, said platform having a separately movable load support, and a single motive power means for moving the platform endwise and imparting a separate movement to said load support.

In testimony whereof, I have hereunto affixed my signature.

WILFRED S. YOUNG.